United States Patent [19]

Onishi

[11] Patent Number: 4,461,662
[45] Date of Patent: Jul. 24, 1984

[54] ULTRASONIC WELDING APPARATUS

[75] Inventor: Heizo Onishi, Nagoya, Japan

[73] Assignee: Brother Kogyo Kabushiki Kaisha, Nagoya, Japan

[21] Appl. No.: 462,952

[22] Filed: Feb. 1, 1983

[30] Foreign Application Priority Data

Feb. 9, 1982 [JP] Japan .............................. 57-16605[U]
Apr. 7, 1982 [JP] Japan .............................. 57-50074[U]
Aug. 31, 1982 [JP] Japan ........................... 57-131842[U]

[51] Int. Cl.³ .......................................... B29C 27/08
[52] U.S. Cl. .................................... 156/73.4; 156/157; 156/502; 156/580.1; 156/580.2; 228/1 R; 264/23
[58] Field of Search .................. 156/73.1, 73.4, 580.1, 156/580.2, 583.91, 157, 502; 228/1 R, 1 B; 264/23; 425/174.2; 100/211

[56] References Cited

U.S. PATENT DOCUMENTS 3,574,039  4/1971  Fehr et al. ............................ 156/515
3,785,910  1/1974  Parry .................................. 156/580.1
4,063,990 12/1977  Volz et al. .......................... 156/580.2
4,279,675  7/1981  Braun ................................ 156/580.2

Primary Examiner—Michael G. Wityshyn
Attorney, Agent, or Firm—Browdy and Neimark

[57] ABSTRACT

An ultrasonic welding apparatus improved in its presser opposed to the working surface of the oscillated horn. The presser roller is provided with a recess on a surface facing the working surface and an elastic member made of rubber and bonded thereon for covering the recess so as to be satisfactorily deformed according to an overlapped thick portion of workpieces to be welded. This causes the pressing force applied around the thick portion to be uniform with a good result. The elastic member comprises a first layer made of foamed rubber and a second layer made of silicone rubber and covering the first layer. The elastic member is preferably split by plural slits perpendicular to the working surface.

17 Claims, 9 Drawing Figures

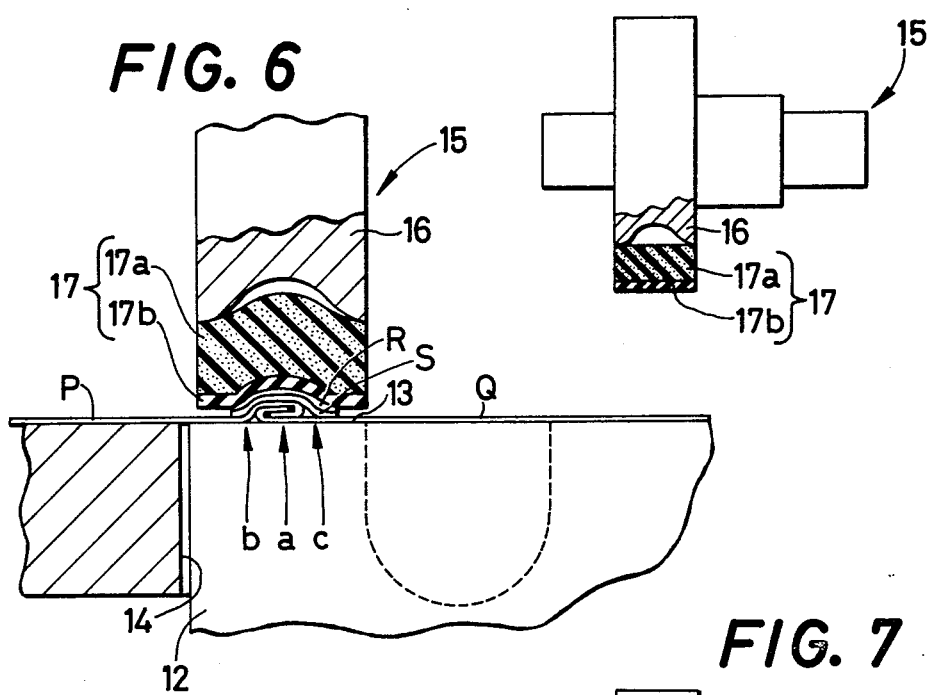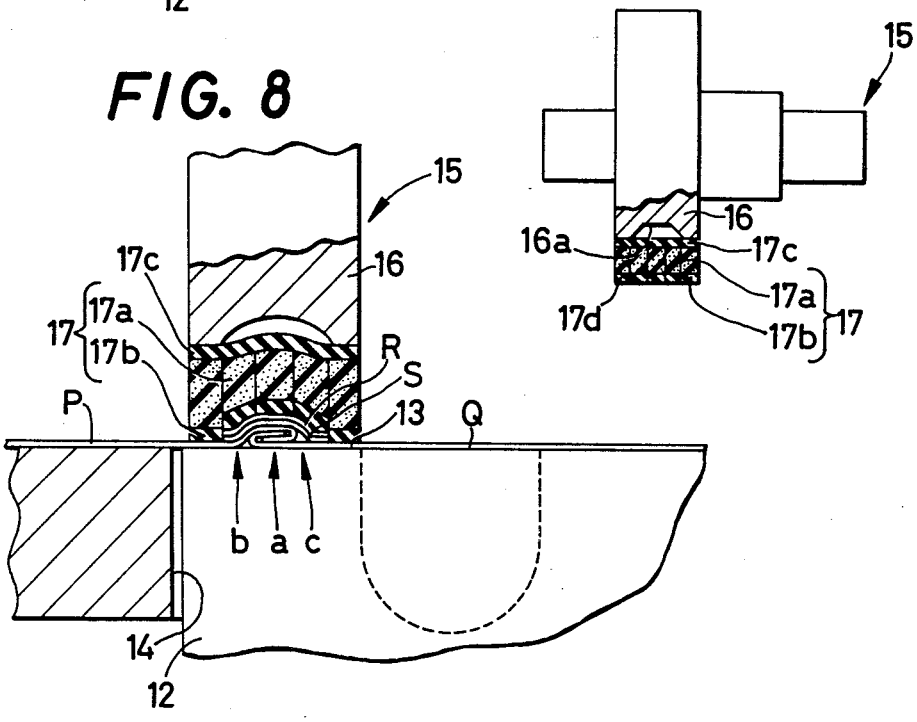

ULTRASONIC WELDING APPARATUS

BACKGROUND OF THE INVENTION

The present invention relates to an improvement of a presser or anvil in an ultrasonic welding apparatus, in which workpieces of a thermoplastic synthetic resin overlapped one above the other and held in forced contact between a working horn having a working surface which is to be imparted ultrasonic oscillation and a presser pressably disposed toward the working surface, for welding the workpieces by frictional heat produced there.

The presser of this kind has traditionally been made of iron or other metallic materials. Therefore, several disadvantages took place, when a pair of workpieces, for example, of thermoplastic synthetic resin, which are overlapped one above the other at one edge of each piece by being folded back, having thereby a raised or thick portion are seam welded using a cover film covering the thick portion and a thermo-adhesive film put under the cover film with the aid of frictional heat produced there. Principal factor to those disadvantages was the fact that the presser was made of a solid matter, which was liable to make the pressing force produced between the presser and the working horn uniform. If the pressing force is adjusted to suit a better welding condition at the thick portion the neighboring ordinary level portions are not welded satisfactorily. On the contrary, an increase of the pressing force at the presser with the object of improved welding effects at the neighboring ordinary level portions often causes a breakage or an unseemly appearance of the cover film at the thick portion.

SUMMARY OF THE INVENTION

This invention was made from such a background and for eliminating the above-mentioned disadvantages in the prior art.

The primary object of this invention is to provide an ultrasonic welding apparatus suitable for welding of workpieces having an overlapped thick portion.

Another object of this invention is to provide a welding apparatus including a presser wherein a surface pressed against the workpieces is easily deformable according to the shape around the thick portion.

The objects of this invention can be achieved by means of disposing an elastic member of an elastic material of rubber family, attached on a surface of the presser which is located in opposition to the working surface of the working horn. Because the elastic member fixed on the surface of the presser can be deformed, when it is forced to press on the thick portion of the workpieces to be welded, according to the shape of the thick portion, so as to make the pressing force applied therearound uniform. By virtue of the particular feature of the elastic member, a breakage or an unseemly appearance which otherwise might take place in the article welded can well be prevented, even when any of thick portions is contained in the workpieces to be worked. The welding apparatus in accordance with this invention can be, in addition to the already described advantages, manufactured in a simple structure and subsequently at a low production cost.

Another object of the invention is to provide an ultrasonic welding apparatus including a presser which is provided thereon with an elastic member easily deformable and free from being stuck to the material to be welded.

Another object of this invention is to provide an ultrasonic welding apparatus including a presser which can easily be deformed and is considerably durable.

The above two objects can be achieved in an apparatus wherein the elastic member is of multi-layered structure comprising a first elastic material layer made of foamed rubber material and disposed on the presser side, and a second elastic material layer made of a silicone family rubber material and disposed on the working horn side.

Still another object of this invention is to provide an ultrasonic welding apparatus including a presser which is provided thereon with an elastic member containing a foamed rubber layer and well prevented from an unexpected expansion of the elastic member due to the expansion of air contained in the foamed rubber layer and a subsequent rupture of the same.

This object can be achieved in an apparatus wherein the elastic member is provided on the side thereof facing the working surface with a plurality of slits formed almost perpendicularly to the working surface.

Further object of this invention is to provide an ultrasonic welding apparatus well adapted to continuous seam welding operation.

This object can be achieved in an apparatus wherein the presser is a metallic roller disposed rotatably about an axis parallel to the working surface, and the elastic member is so disposed as to cover the whole peripheral surface of the roller.

The above and other objects, features and advantages of the present invention will become more apparent from the following description taken in connection with the accompanying drawings.

BRIEF DESCRIPTION OF THE DRAWING

FIGS. 5 and 6 are views showing another embodiment of this invention; and

FIGS. 7 and 8 are views showing a further embodiment of this invention.

DETAILED DESCRIPTION OF THE PREFERRED EMBODIMENT

Figure 3:
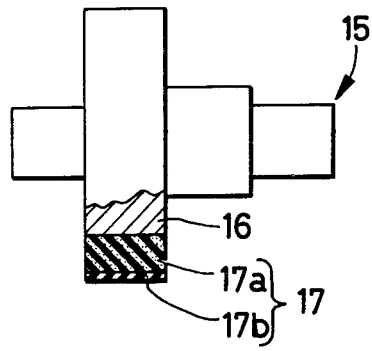
FIG. 3 is an elevational view of an essential part of the welding apparatus, partly being broken away.
Figure 2:
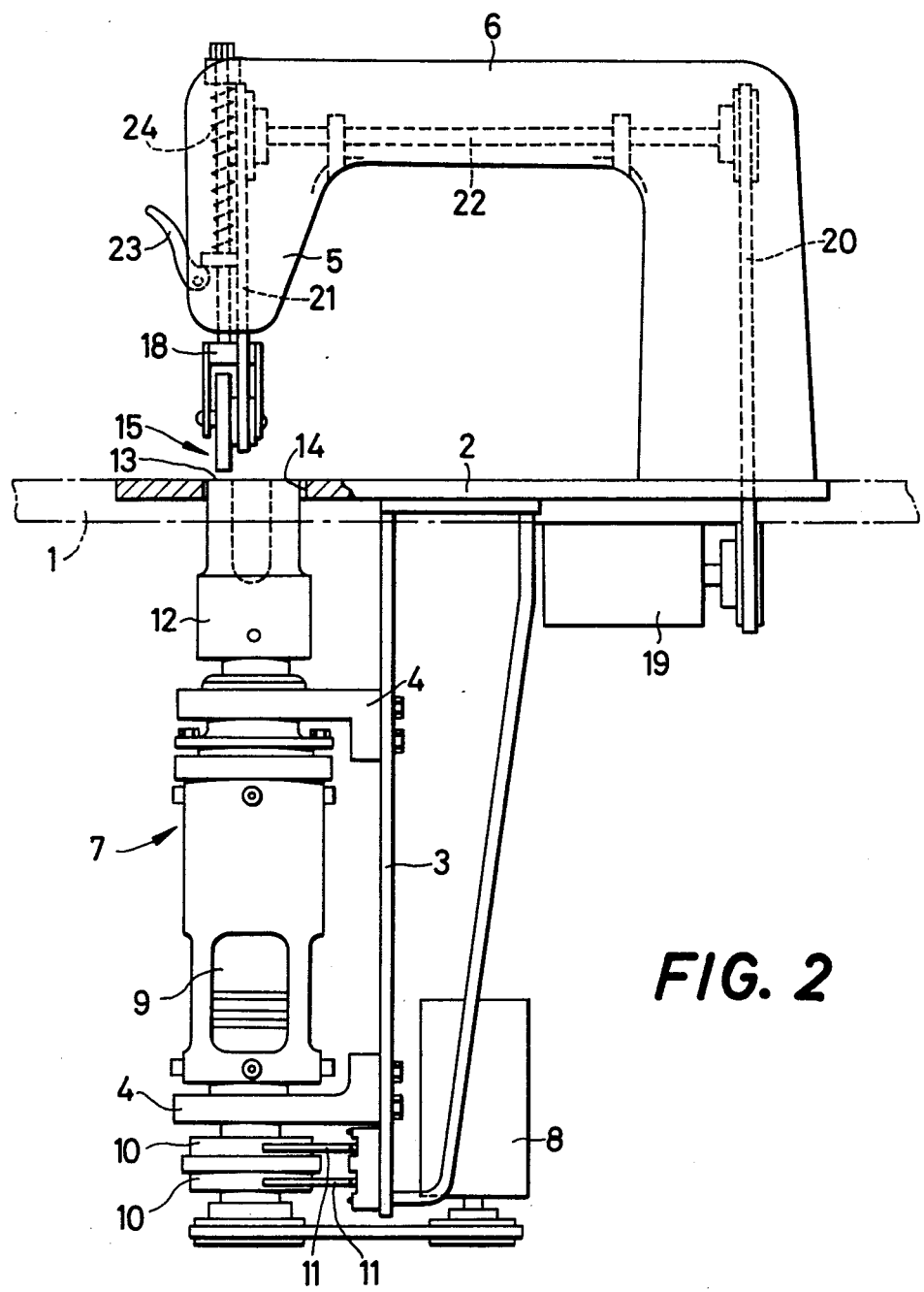
FIG. 2 is an elevational view of an ultrasonic seam welding apparatus embodying the concept of this invention.

Referring first to FIGS. 2 and 3 which illustrates one embodiment of the present invention, an ultrasonic seam welding apparatus will be described.

A work table 1 constituting a part of a machine frame structure is provided, as can be seen in FIG. 2, with a bed 2 secured thereon. On the under surface of the bed 2 a frame 3, on which a pair of supporters 4 are secured, is firmly attached. An arm 6 extending leftwardly in FIG. 2 for holding a head 5 on the left end is secured on the top surface of the bed 2. By the pair of supporters 4, being mounted one above the other, a converter-horn assembly 7 is supported so as to be rotatable about a vertical axis. The converter-horn assembly 7 is unidirectionally rotatable by the driving of an electric motor 8 which is mounted on the frame 3. The converter-horn assembly 7 has a built-in electroacoustic converter 9, which is to be imparted ultrasonic oscillation due to the supplying of high frequency current from a high frequency current generating system (not shown) by way of a pair of slip rings 10 and a pair of contactors 11 held by the frame 3. A working horn 12 is connected to the electroacoustic converter 9 via an amplifying horn (not shown). The upper portion of the working horn 12 is formed into annular shape, and the top surface thereof, i.e., an annular working surface 13 doing vertical ultrasonic oscillation is so situated as to be exposed at the top of the work table 1 through a circular opening 14 formed in the bed 2 and in the same level with the top surface of the work table 1 and the bed 2.

On the other hand, a presser roller 15, as a presser or anvil, is disposed on the lower portion of the head 5 in opposition to the above-mentioned working surface 13. This presser roller 15 is, illustrated in FIG. 3, composed of a metal (iron) roller portion 16, and an elastic member 17, including an elastic material layer 17a made of foamed nitrile rubber for being bonded onto the periphery of the roller portion 16 and another elastic material layer 17b made of silicone rubber for covering the first elastic layer 17a. This presser roller 15 is, by way of its roller portion 16, rotatably retained by a roller holder 18, which is vertically movably supported by the head 5, and driven in the same rotational direction as that of the working surface 13 at a contacting place with the working surface 13 by the power coming from an electric motor 19 secured on the work table 1 by way of belts 20, 21 and a shaft 22, etc. A lift lever 23 is to be lifted up for keeping the roller holder 18 at an upper position. At the lifted up position as shown in FIG. 2 the lift lever 23 maintains the presser roller 15, resisting the spring force of a compression spring 24, at the upper position where the same does not abut the working surface 13.

Operating manner of an ultrasonic sewing machine thus constructed, when seam welding is applied on workpieces including an overlapped thick portion will be described hereunder.

Figure 1A:
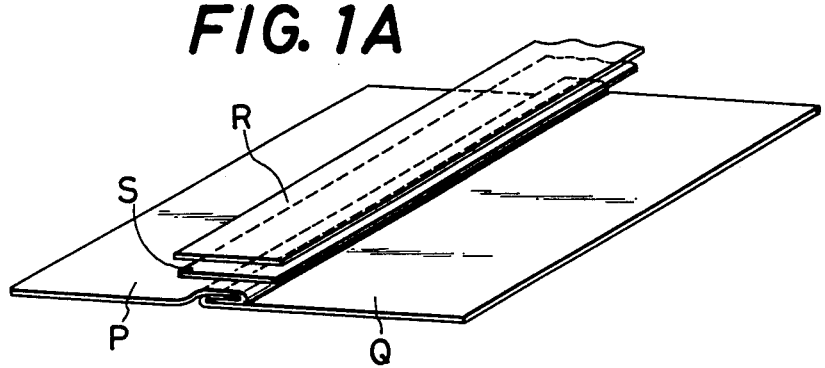
FIGS. 1A and 1B are both explanatory views for workpieces having an overlapped thick portion therein.
Figure 1B:
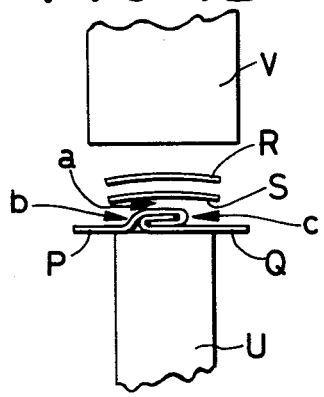
Figure 4:
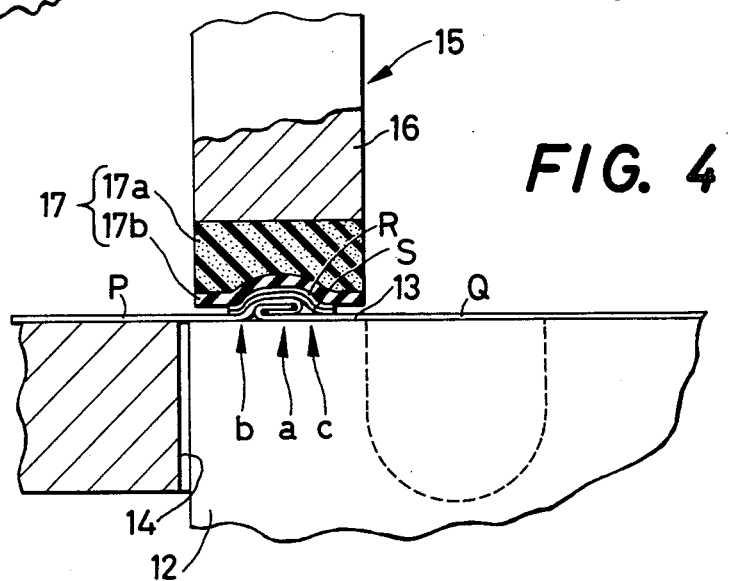
FIG. 4 is an explanatory elevational view for describing the operation of the welding apparatus.

When the lift lever 23 is lifted up by an operator the presser roller 15 is thereby lifted upwards as shown in FIG. 2. After a set of materials to be seam welded including, as shown in FIG. 1, two pieces of sheet-like workpieces P, Q overlapped one above the other at one edge portion of each by being folded back, a piece of cover film R covering the overlapped thick portion a, and a piece of thermo-adhesive film S interposed between the above-mentioned two matters, has been placed on the working surface 13, the lift lever is operated for lowering the presser roller 15. An operation of a not shown pedal at this stage will start both motors 8 and 19 and cause the high frequency current generating system (not shown) to supply power to the electroacoustic converter 9, which in turn imparts the working horn 12 ultrasonic oscillation. Both elastic material layers 17a, 17b of the elastic member 17, which are bonded around the presser roller 15, are forced to be concaved as shown in FIG. 4, at their abutted portion with the thick portion a of the workpieces, due to their own elasticity. This brings about an adapted deformation of the elastic material layers 17a, 17b such that they may be closely contacted with the overlapped thick portion a and the neighboring ordinary level portions b, c of the workpieces. All of the thick portion a and its neighboring portions b, c, will receive, through this close contact, an almost uniform pressing force thereon.

Frictional heat produced by the operation of the electroacoustic converter 9 will naturally be uniform in every portion of the three a, b, and c. As the workpieces placed on the working surface 13 is continuously moved due to the rotation of the motors 8, 19, a uniform and continuous seam welding can be therefore expected in each part of the above-mentioned three portions a, b, and c.

Although the presser roller 15 in the above embodiment is of cylindrical form, and its roller portion 16 is provided on its external periphery with an elastic member 17 simply bonded thereon, it is also possible to form an annular recess or groove 16a on the external periphery of the roller portion 16, as shown in FIGS. 5 and 6. Since the elastic member 17 is so mounted as to cover the annular groove 16a, the elastic member 17 which is to be contacted with the thick portion a is to be concaved along the outline of the annular groove 16a. It will naturally cause a better contactness between the elastic member 17 and the thick portion a and its neighboring portions b, c of the workpieces with a result of bringing about a more uniform pressing force on the seam welded portion of the workpieces. It is also another idea to make the elastic member 17, in place of those shown in FIGS. 3 and 4, and in FIGS. 5 and 6, threefold as shown in FIG. 7, i.e., to use an elastic material layer 17a made of foamed nitrile rubber with a coverage on either side thereof, an outer side elastic material layer 17b and an inner side elastic material layer 17c made of silicone rubber, having a plurality of slits 17d formed, almost perpendicularly to the working surface 13 of the working horn 12, ranging from the elastic material layer 17b to the boundary of the intermediate elastic material layer 17a and the inner elastic material layer 17c. Each part of the elastic member 17 splitted by the slits 17d can be well deformed as shown in FIG. 8, when the elastic member 17 is contacted with the thick portion a of the workpieces, for seam welding the same, according to the shape around the thick portion a. It will accompany several advantages such as a more uniformalization of the pressing force applied on the seam welded portion, prevention of unexpected expansion of the elastic member 17 and thereby caused rupture thereof due to the expansion of the air contained in the elastic material layer 17a of foamed nitrile rubber under the frictional heat produced by the seam welding operation.

It is also another alternative permissible to this invention to replace the above-mentioned elastic member 17, which is bonded around the external periphery of the roller portion 16 of the presser roller 15, with a freely detachable elastic member made in the form of an endless belt, i.e., a multi-layered belt composed of foamed nitrile rubber layer and silicone rubber layer or layers, which is to be attached onto the external periphery of the metallic roller portion upon occasion.

The above description is related to an embodiment in which a thick portion a contained in a workpiece is extended along the feed direction of the workpiece decided by the rotation of the presser roller 15 and the working horn 12. It holds true, not being limited to that type welding, also in another case where the thick portion runs crossing the feed direction of the workpiece to be welded. As the elastic member 17 fixed on presser roller 15 can be, similarly even in such an instance, elastically deformed according to the shape of the thick portion, the identical effect is to be expected.

Unlike the above embodiment wherein the invention is applied to a seam welding apparatus or ultrasonic sewing machine for welding a workpiece while the same is continuously fed due to the rotation of the presser roller 15 and the working horn 12, the present invention is applicable to a so called ultrasonic welder in which a workpiece, not being continuously fed, is welded only sporadically where it is swollen.

This invention is also good for a presser roller which is provided with an elastic member 17 of a single layer structure made of for example silicone rubber, besides the above-mentioned one having a double-layer elastic member 17 composed of an elastic material layer 17a of foamed nitrile rubber and an elastic material layer 17b of silicone rubber. What should be mentioned here further is that the elastic material layer 17a made of nitrile rubber, fluorine-contained rubber, or silicone rubber, not being limited to the foamed nitrile rubber, showed desirable effects, according to the experiments by the inventor. As the elastic material layer 17b, any material of rubber family can be recommended, so long as it is not stuck to the workpiece when the welding operation is executed.

While the present invention has been described in its preferred embodiments, it is to be understood that the invention is not limited thereto but may be otherwise embodied within the scope of the following claims.

What is claimed is:

1. A process for seam-welding sheet-like workpieces at their overlapped portions on an ultrasonic welding apparatus including a working horn connected to an electroacoustic converter, and a presser having a contact surface facing a working surface of of the working horn, said process comprising the steps of:
   using an elastic member having a surface to serve as said contact surface of said presser;
   placing said workpieces on said working surface of the horn such that edge portions of the workpieces are folded and overlapped on each other so as to provide a thick portion raised above the plane of the sheet-like workpieces,
   effecting a relative movement between said presser and said horn toward each other in a direction perpendicular to said working surface until said contact surface of the presser comes into contact with said thick portion of the workpieces;
   forcing said thick portion and neighboring level portions adjacent to said thick portion against said working surface by effecting a further relative movement between the presser and said horn while allowing said presser to be inwardly elastically deformed at said elastic member so that said contact surface is adapted to follow the shape of said thick portion of the workpieces, thereby providing said thick portion and said level portions with a substantially uniform pressure against said working surface; and
   activating said electroacoustic converter to apply ultrasonic oscillation to said horn and produce frictional heat between said horn and said presser for welding said workpieces at said thick portion.

2. A process as claimed in claim 1, wherein the step of allowing the presser to be inwardly deformed includes providing a recess formed in the surface of said presser in the area at which said elastic member is attached such that the elastic member is held in contact with at least non-recessed surfaces adjacent to and on both sides of said recess.

3. A process as claimed in claim 1, wherein the step of allowing the presser to be inwardly deformed includes providing a plurality of slits formed in said elastic member substantially perpendicularly to said working surface.

4. A process as claimed in claim 1, wherein the step of using said elastic member includes providing a multi-layer structure comprising a first inner elastic layer made of from rubber material and a second outer elastic layer made of silicone family rubber material.

5. A process as claimed in claim 1, further comprising a step of covering with a film at least said thick portion of the workpieces on the side to be in contact with said contact surface of the presser, before said relative movement is effected.

6. An ultrasonic welding apparatus comprising:
   a working horn connected to an electroacoustic converter and having a working surface;
   a presser disposed in opposition to said working surface, said presser being provided on its surface facing said working surface with an elastic member of multi-layer structure which comprises a first inner layer made of foam rubber material and disposed on the presser side, and a second outer layer made of silicone family rubber material and disposed on the working horn side; and
   pressing means which is operatively connected to said presser for biasing said presser toward said working surface, to weld workpieces overlapped one above the other and held in forced contact with and between said working surface and said presser.

7. An apparatus as claimed in claim 6, wherein said presser is a metallic roller disposed rotatably about an axis parallel to said working surface, and said elastic member is so disposed as to cover the whole peripheral surface of said roller.

8. An apparatus as claimed in claim 6, wherein said elastic member is provided on the side thereof facing said working surface with a plurality of slits formed almost perpendicularly to said working surface.

9. An apparatus as claimed in claim 6, wherein said presser is provided at least in a part of its surface facing said working surface with a recessed portion, and said elastic member is attached to said presser in such a manner as to cover said recessed portion and to be held in contact with at least non-recessed portions of said surface of the presser adjacent to and on both sides of said recessed portion.

10. An apparatus as claimed in claim 9, wherein said recessed portion is not filled with said elastic member.

11. An apparatus as claimed in claim 9, wherein said elastic member is provided on the side thereof facing said working surface with a plurality of slits formed almost perpendicularly to said working surface.

12. An apparatus as claimed in claim 11, wherein said presser is a metallic roller disposed rotatably about an axis parallel to said working surface, and said elastic member is so disposed as to cover the whole peripheral surface of said roller.

13. An ultrasonic welding apparatus comprising:
   a working horn connected to an electroacoustic converter and having a working surface;
   a presser disposed in opposition to said working surface, said presser being provided on its surface facing said working surface with an elastic member made of rubber family materials, and further provided in a part of said surface thereof with a recessed portion, said elastic member being attached to said presser in such a manner as to cover said recessed portion and to be held in contact with at least non-recessed portions of said surface of the presser adjacent to and on both sides of said recessed portion; and pressing means which is operatively connected to said presser for biasing said presser toward said working surface, to weld workpieces overlapped one above the other and held in forced contact with and between said working surface and said presser.

14. An apparatus as claimed in claim 13, wherein said recessed portion is not filled with said elastic member.

15. An apparatus as claimed in claim 13, wherein said presser is a metallic roller disposed rotatably about an axis parallel to said working surface, and said elastic member is so disposed as to cover the whole peripheral surface of said roller.

16. An ultrasonic welding apparatus comprising:

a working horn connected to an electroacoustic converter and having a working surface;

a presser disposed in opposition to said working surface, said presser being provided on its surface facing said working surface with an elastic member made of rubber family materials, said elastic member being provided on the side thereof facing said working surface with a plurality of slits formed almost perpendicularly to said working surface; and pressing means which is operatively connected to said presser for biasing said presser toward said working surface, to weld workpieces overlapped one above the other and held in forced contact with and between said working surface and said presser.

17. An apparatus as claimed in claim 16, wherein said presser is a metallic roller disposed rotatably about an axis parallel to said working surface, and said elastic member is so disposed as to cover the whole peripheral surface of said roller.

* * * * *